United States Patent
Ishihara

(10) Patent No.: US 12,052,702 B2
(45) Date of Patent: Jul. 30, 2024

(54) COMMUNICATION DEVICE THAT PERFORMS WIRELESS COMMUNICATION WITH ANOTHER COMMUNICATION DEVICE, CONTROL METHOD THEREOF, AND STORAGE MEDIUM

(71) Applicant: CANON KABUSHIKI KAISHA, Tokyo (JP)

(72) Inventor: Tsubasa Ishihara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/517,236

(22) Filed: Nov. 22, 2023

(65) Prior Publication Data

US 2024/0205897 A1    Jun. 20, 2024

(30) Foreign Application Priority Data

Dec. 16, 2022 (JP) ................. 2022-201240

(51) Int. Cl.
*H04W 72/0453* (2023.01)
*G06F 3/12* (2006.01)
*H04W 76/10* (2018.01)

(52) U.S. Cl.
CPC ...... *H04W 72/0453* (2013.01); *G06F 3/1204* (2013.01); *G06F 3/1236* (2013.01); *G06F 3/1292* (2013.01); *H04W 76/10* (2018.02)

(58) Field of Classification Search
CPC . H04W 72/0453; H04W 76/10; G06F 3/1204; G06F 3/1236; G06F 3/1292
See application file for complete search history.

(56) References Cited

U.S. PATENT DOCUMENTS

2017/0079066 A1* 3/2017 Takano ............. H04W 72/0453
2022/0030592 A1* 1/2022 Wachi .................. H04W 36/32

FOREIGN PATENT DOCUMENTS

JP      2012-019487 A    1/2012

* cited by examiner

*Primary Examiner* — Quang N Vo
(74) *Attorney, Agent, or Firm* — VENABLE LLP

(57) ABSTRACT

A communication device, capable of performing a first-mode communication via a relay device and a second-mode communication without the relay device, controls to perform wireless communication in the second mode using the set frequency band, when the wireless communication is performed in the second mode in a case where connection of wireless communication in the first mode using a frequency band at least partially overlapping the set frequency band is not made, and controls such that in a case where the set frequency band is the first frequency band, and connection of wireless communication in the first mode is performed using a frequency band at least partially overlapping the first frequency band, connection of wireless communication in the second mode using the first frequency band is not performed.

17 Claims, 11 Drawing Sheets

COMMUNICATION DEVICE THAT PERFORMS WIRELESS COMMUNICATION WITH ANOTHER COMMUNICATION DEVICE, CONTROL METHOD THEREOF, AND STORAGE MEDIUM

BACKGROUND OF THE INVENTION

Field of the Invention

The present invention relates to a communication device that performs wireless communication with another communication device, a control method thereof, and a storage medium.

Description of the Related Art

In recent years, many communication devices that perform wireless communication according to a communication scheme conforming to IEEE802.11 have been commercialized for use. For example, for wireless communication between two communication devices, there is an infrastructure mode in which wireless communication is performed via a relay device that relays communication between the two communication devices, that is, via an access point, and an ad-hoc mode in which wireless communication is performed without using the relay device. In addition, there has been known an image forming apparatus capable of executing wireless communication in the infrastructure mode and wireless communication in an ad-hoc mode in parallel (for example, see Japanese Laid-Open Patent Publication (kokai) No. 2012-19487).

However, in the image forming apparatus described in Japanese Laid-Open Patent Publication (kokai) No. 2012-19487, when the wireless communication in the infrastructure mode and the wireless communication in the ad-hoc mode are executed in parallel, there is a possibility that a decrease in throughput occurs, for example, depending on various conditions such as a frequency band used in each communication. When the decrease in throughput occurs, convenience in wireless communication also decreases.

SUMMARY OF THE INVENTION

The present invention provides a communication device capable of improving convenience in wireless communication, a control method of the communication device, and a storage medium.

Accordingly, the present invention provides a communication device capable of executing wireless communication with another communication device, the communication device comprising at least one memory and at least one processor and/or at least one circuit which function as a first communication unit configured to perform communication in a first mode in which wireless communication with another communication device is performed via a relay device according to a communication scheme conforming to a predetermined communication standard, a second communication unit configured to perform communication in a second mode in which wireless communication with another communication device is performed without using the relay device according to the communication scheme conforming to the predetermined communication standard, a setting unit configured to set a frequency band to be used for communication in the second mode, and a control unit configured to perform control such that: when wireless communication is performed in the second mode in a case where connection of wireless communication in the first mode using a frequency band at least partially overlapping the frequency band set by the setting unit is not made, the wireless communication in the second mode is performed using the frequency band set by the setting unit; and in a case where a first frequency band is set by the setting unit and connection of wireless communication in the first mode is made using a frequency band at least partially overlapping the first frequency band, connection of the wireless communication in the second mode using the first frequency band is not performed.

According to the present invention, it is possible to improve convenience in wireless communication.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. However, the configurations described in the embodiments below are merely examples. For example, each part constituting the present invention can be replaced with a part having any configuration capable of exhibiting similar functions. In addition, any component may be added.

Figure 1:
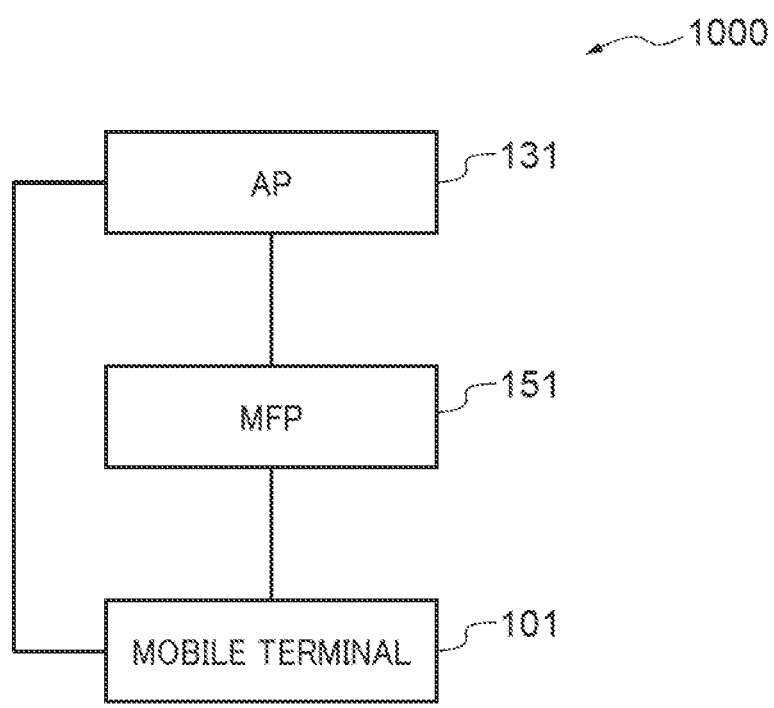
FIG. 1 is a block diagram showing an example of a configuration of a communication system.

FIG. 1 is a block diagram showing an example of a configuration of a communication system 1000. The communication system 1000 shown in FIG. 1 is a wireless communication system in which a plurality of communication devices can communicate with each other in a wireless manner. In the present embodiment, the communication system 1000 includes a mobile terminal 101, a multi function peripheral (MFP) 151, and an access point (AP) 131. It should be noted that each of the number of mobile terminals 101, the number of MFPs 151, and the number of access points 131 is one in the configuration shown in FIG. 1, but is not limited thereto, and may be two or more.

The mobile terminal 101 is a communication device capable of wireless communication. The mobile terminal 101 is not particularly limited, and for example, a notebook personal computer, a tablet terminal, a smartphone, or the like can be used as the mobile terminal 101. The MFP 151 is a communication device different from the mobile terminal 101. The MFP 151 is a multi function peripheral having a printing function (printing unit), a reading function (scanner), a FAX function, and the like. It should be noted that, in the present embodiment, the MFP 151 may also be referred to as an "image forming apparatus". Furthermore, in the communication system 1000, for example, a facsimile device, a scanner device, a projector, a single-function printing device, or the like can be used instead of the MFP 151.

The access point 131 is a relay device that is provided separately from (outside) the mobile terminal 101 and the MFP 151 to relay communication between the mobile terminal 101 and the MFP 151. As the access point 131, for example, a wireless LAN router or the like can be used. In the present embodiment, the access point 131 functions as a base station device of a wireless LAN (WLAN). It should be noted that the access point 131 may also be referred to as an "external access point 131" or an "external wireless base station (external master station)".

The mobile terminal 101 and the MFP 151 are configured to be able to execute a first mode and a second mode as wireless communication modes for performing wireless communication with each other. The first mode is a mode in which the mobile terminal 101 and the MFP 151 perform wireless communication via the access point 131. The second mode is a mode in which the mobile terminal 101 and the MFP 151 directly perform wireless communication without via the access point 131. The first mode may also be referred to as an "infrastructure mode", a "wireless infra mode", or an "infra mode (infra communication mode)". The second mode may also be referred to as an "ad-hoc mode", a "peer-to-peer (P2P) mode", an "independent mode", or a "wireless direct communication (direct communication mode)". The connection with the access point 131 to be established for operation in the infrastructure mode is referred to as "infrastructure connection (infra connection)".

In the present embodiment, in the infra connection, the MFP 151 operates as a slave station, and the access point 131 operates as a master station. The "master station" is a device that forms a network and determines a communication channel to be used in the network. The "slave station" is a device that does not determine a communication channel to be used in a network to which the slave station belongs, and uses the communication channel determined by the master station.

The access point 131 performs wireless communication with an (authenticated) communication device permitted to connect to the access point 131. Then, the access point 131 is configured to relay wireless communication between the communication device and another communication device under the infrastructure mode. In addition, the access point 131 is also configured to be connected to, for example, a wired communication network to relay communication between a communication device connected to the wired communication network and another communication device wirelessly connected to the access point 131.

The P2P mode includes Wi-Fi Direct (registered trademark), a soft AP mode, or the like. Hereinafter, Wi-Fi Direct (registered trademark) may also be referred to as "WFD". The P2P mode is a communication scheme conforming to IEEE802.11 series. In the present embodiment, the P2P mode includes an AP mode in which the MFP 151 operates as an access point. The user can arbitrarily set the connection information (e.g., SSID and password) of the access point to be valid in the MFP 151 in the AP mode. It should be noted that the P2P mode may include, for example, a WFD mode for the MFP 151 to communicate via Wi-Fi Direct (WFD).

Which one of a plurality of WFD-compatible devices operates as a master station is determined, for example, according to the sequence "group owner negotiation". It should be noted that the master station may be determined without performing the group owner negotiation. A device that is a WFD-compatible device and serves as a master station is particularly referred to as a "group owner". A direct connection between devices established when the devices operate in the P2P mode is referred to as a "direct connection". In the present embodiment, in the direct connection, the MFP 151 operates as a master station, and the mobile terminal 101 operates as a slave station.

Figure 2:
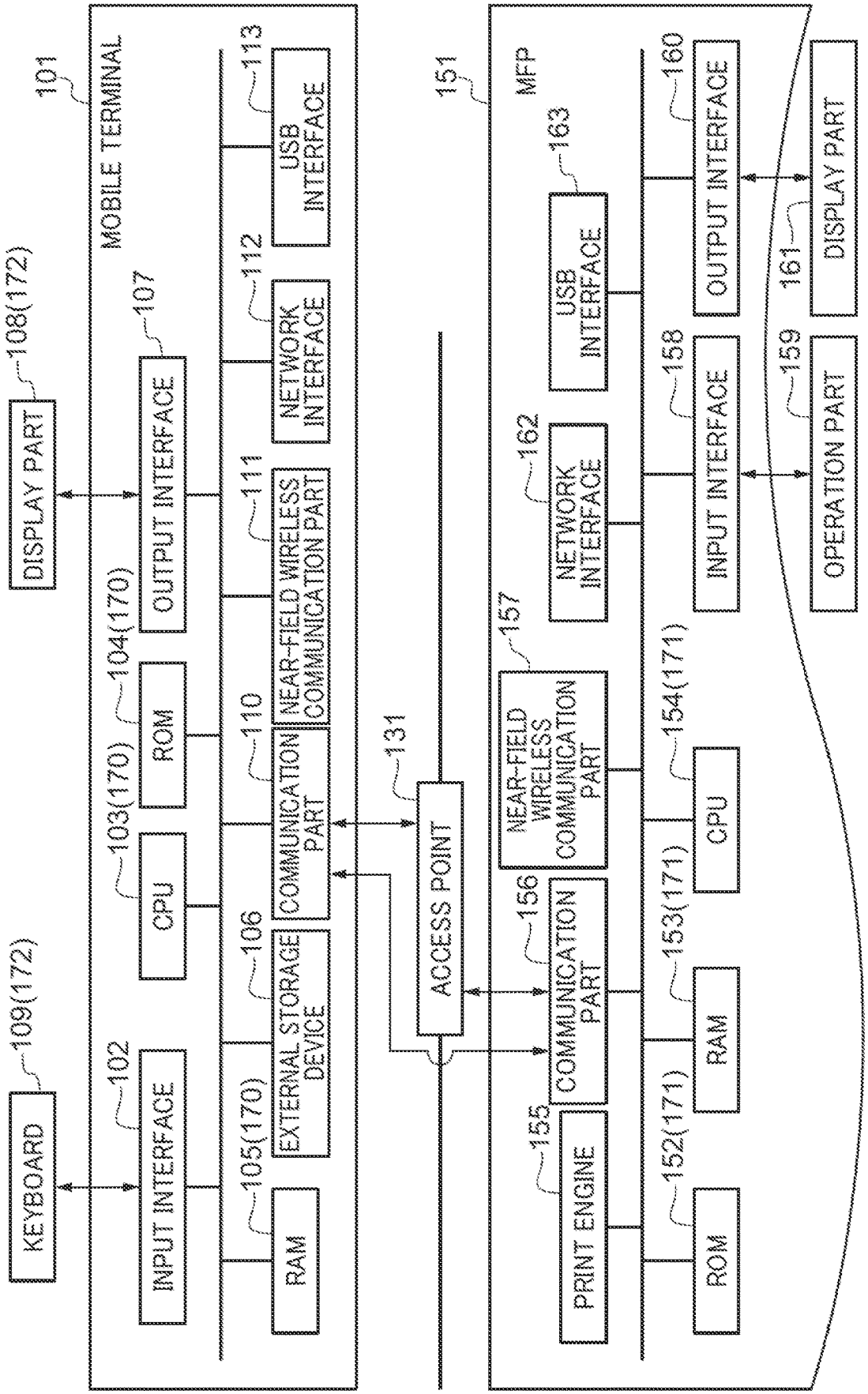
FIG. 2 is a block diagram showing a hardware configuration of a mobile terminal and a hardware configuration of an MFP, in the communication system shown in FIG. 1.

FIG. 2 is a block diagram showing a hardware configuration of the mobile terminal 101 and a hardware configuration of the MFP 151, in the communication system 1000 shown in FIG. 1. The mobile terminal 101 includes an input interface 102, a CPU 103, a ROM 104, a RAM 105, an external storage device 106, an output interface 107, a display part 108, a keyboard 109, a communication part (acquisition unit) 110, a near-field wireless communication part 111, a network interface 112, and a USB interface 113. In the mobile terminal 101, the CPU 103, the ROM 104, the RAM 105, and the like constitute a computer 170 of the mobile terminal 101.

The input interface 102 is an interface for receiving a data input or an operation instruction from a user by operation on an operation part (an execution setting unit) 172, which includes the keyboard 109 and the like. The instruction from the user is not particularly limited, and the instruction from the user is, for example, setting of execution of the infra communication mode (first mode) and setting of execution of the direct communication mode (second mode). It should be noted that the operation part 172 may include, for example, a soft keyboard, a soft button, and the like displayed on the display part 108 in addition to the keyboard 109 and the like.

The CPU 103 is a system control part and controls the entire mobile terminal 101. The ROM 104 stores fixed data such as a control program, a data table, and an embedded operating system (OS) program. In the present embodiment, each control program stored in the ROM 104 performs software execution control such as scheduling, task switching, and interruption processing, under the management of the embedded OS stored in the ROM 104. In addition, the control program stored in the ROM 104 also includes a program for causing the computer 170 to execute each unit and each means (communication device control method) of the mobile terminal 101.

The RAM 105 includes a static random access memory (SRAM) or the like that requires backup power. Since the RAM 105 holds data by a primary battery (not shown) for data backup, important data such as program control variables can be stored therein without being volatilized. In addition, a memory area for storing setting information on the mobile terminal 101, management data of the mobile terminal 101, and the like is also provided in the RAM 105. The RAM 105 is also used as a main memory and/or a work memory of the CPU 103.

The external storage device 106 stores, for example, a print information generation program for generating print information that can be interpreted by the MFP 151. The output interface 107 is an interface that performs control for causing the display part 108 to display data, to make notification of a state of the mobile terminal 101, and the like. The display part 108 includes a light emitting diode (LED), a liquid crystal display (LCD), and the like and displays data, makes the notification of a state of the mobile terminal 101, and the like.

The communication part 110 is a part that is communicably connected to devices such as the MFP 151 and the access point 131 to execute data communication. For example, the communication part 110 can be connected to an AP (e.g., a communication part 156) in the MFP 151. The mobile terminal 101 and the MFP 151 can perform wireless direct communication by wireless direct (direct connection) via the communication part 110 and the communication part 156. In addition, the mobile terminal 101 and the MFP 151 can perform infra communication by the wireless infra via the communication part 110, the communication part 156, and the access point 131.

The wireless communication scheme used by the communication part 110 and the communication part 156 is a communication scheme conforming to a predetermined communication standard. The wireless communication scheme used in the present embodiment is, for example, a communication scheme conforming to the communication standard of IEEE802.11, that is, Wi-Fi (registered trademark). This enables highly-versatile and smooth wireless communication. It should be noted that the wireless communication scheme is not limited to a communication scheme conforming to the communication standard of IEEE802.11.

The near-field wireless communication part 111 is wirelessly connected to a device such as a near-field wireless communication part 157 of the MFP 151 at a short distance to execute data communication. The near-field wireless communication part 111 performs communication by a communication scheme different from that of the communication part 110. The communication scheme used by the near-field wireless communication part 111 is not particularly limited, and is, for example, near field communication (NFC), Bluetooth (registered trademark), Classic, Bluetooth low energy (BLE), Wi-Fi Aware, or the like.

The network interface 112 is a connection interface (I/F) that controls processing of communication in a wireless manner and processing of communication via a wired LAN cable. The USB interface 113 is a connection interface that controls USB connection performed via a USB cable. Specifically, the USB interface 113 is an interface connected to devices such as the MFP 151 and the external access point 131 via a USB to execute data communication with these connected devices.

The MFP 151 includes a ROM 152, a RAM 153, a CPU 154, a print engine 155, a communication part 156, a near-field wireless communication part 157, an input interface 158, an operation part 159, an output interface 160, a display part 161, a network interface 162, and a USB interface 163. In the MFP 151, the ROM 152, the RAM 153, the CPU 154, and the like constitute a computer 171 of the MFP 151.

The communication part 156 controls communication processing using each interface. The MFP 151 is operatable in an infrastructure mode or a peer-to-peer (P2P) mode, as a mode for performing communication using the communication part 156. The communication part 156 can operate as an access point inside the MFP 151. For example, when the user instructs the internal access point to be valid, the MFP 151 can operate as an access point.

The communication part 156 may operate as an access point by having hardware that functions as an access point, or may operate as an access point by software for causing the communication part 156 to function as an access point. It should be noted that, in a case where the MFP 151 operates as a master station, the communication part 156 can maintain P2P wireless connection with a predetermined number or less (e.g., 3 or less) of devices as slave stations in parallel. The communication part 156 can execute wireless communication using a frequency band selected from among 2.4 GHz, 5 GHz, and 6 GHz.

The near-field wireless communication part 157 is configured to be wirelessly connected to a device such as the near-field wireless communication part 111 of the mobile terminal 101 at a short distance. The communication scheme in the near-field wireless communication part 157 is, for example, similar to the communication scheme in the near-field wireless communication part 111.

The RAM 153 includes an SRAM or the like that requires backup power. Since the RAM 153 holds data by a primary battery (not shown) for data backup, important data such as program control variables can be stored therein without being volatilized. A memory area for storing setting information on the MFP 151, management data of the MFP 151, and the like is also provided in the RAM 153. The RAM 153 is also used as a main memory and/or a work memory of the CPU 154, and stores a reception buffer for temporarily storing print information received from the mobile terminal 101 or the like, and various types of information.

The ROM 152 stores fixed data such as a control program to be executed by the CPU 154, a data table, and an OS program. In the present embodiment, each control program stored in the ROM 152 performs software execution control such as scheduling, task switching, and interruption processing, under the management of the embedded OS stored in the ROM 152. The CPU 154 is a system control part, and controls the entire MFP 151.

The print engine 155 adds a recording agent such as ink onto a recording medium such as paper on the basis of information stored in the RAM 153 and/or a print job received from the mobile terminal 101 or the like. By this way, print processing for forming an image on the recording medium is executed and a print result is output. In general, since the amount of print job data transmitted from the mobile terminal 101 or the like is relatively large, it is required to use a communication scheme capable of high-speed communication for communication of the print job. Therefore, the MFP 151 receives a print job via the communication part 156 capable of performing communication at a higher speed than the near-field wireless communication part 157.

It should be noted that, although the printing using the ink has been described in the present embodiment, the printing is not limited thereto, and for example, printing by an electrophotographic method using toner may be used. Furthermore, the MFP 151 may be a device to which an ink cartridge is detachably attached, or may be a device in which ink is replenished from an ink bottle to an ink tank.

The input interface 158 is an interface for receiving a data input and an operation instruction from the user by operation on the operation part 159 including a mechanical (hardware) button or the like. It should be noted that the operation part 159 may include, for example, a soft keyboard, a soft button, and the like displayed on the display part 161. The output interface 160 is an interface that performs control for causing the display part 161 to display data, to make notification of a state of the MFP 151, and the like. The display part 161 includes a light emitting diode (LED), a liquid crystal display (LCD), and the like and displays data, makes the notification of a state of the MFP 151, and the like.

The USB interface 163 is a connection interface that controls USB connection performed via a USB cable. Specifically, the USB interface 163 is an interface connected to devices such as the external access point 131 via a USB to execute data communication with these connected devices. It should be noted that a memory such as an external HDD or an SD card may be connected to the MFP 151 as an optional device. The information to be stored in the MFP 151 may be stored in the memory.

Figure 3B:
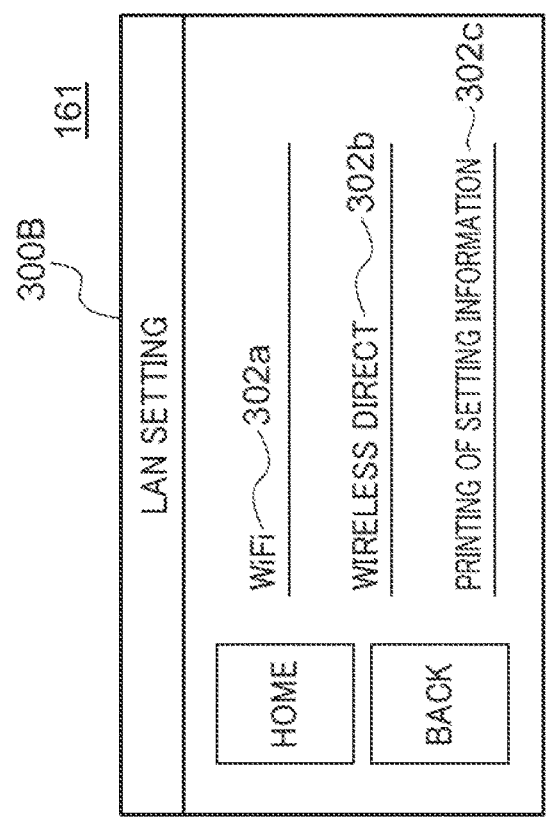
FIGS. 3A to 3I are diagrams for explaining examples of screens for performing various settings of direct communication.
Figure 3A:
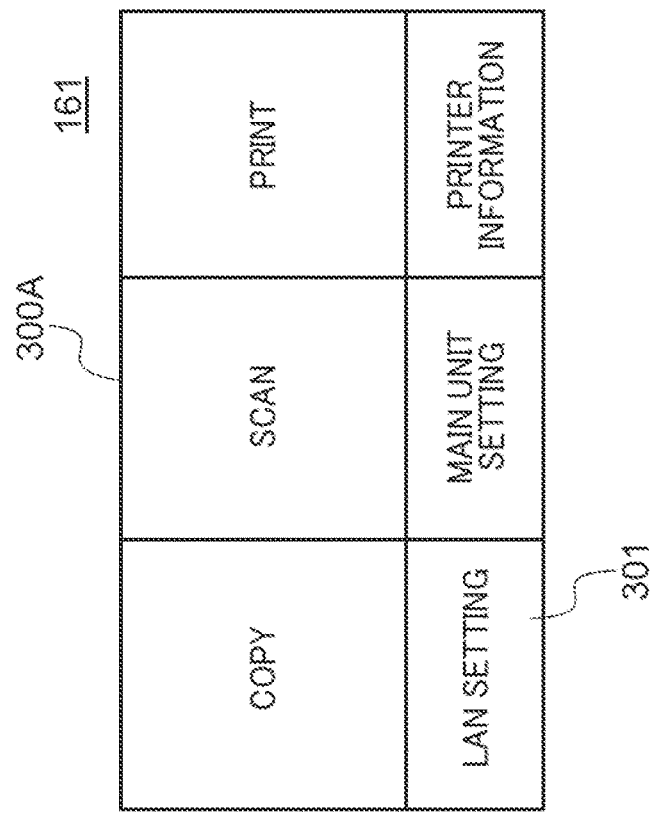
Figure 3C:
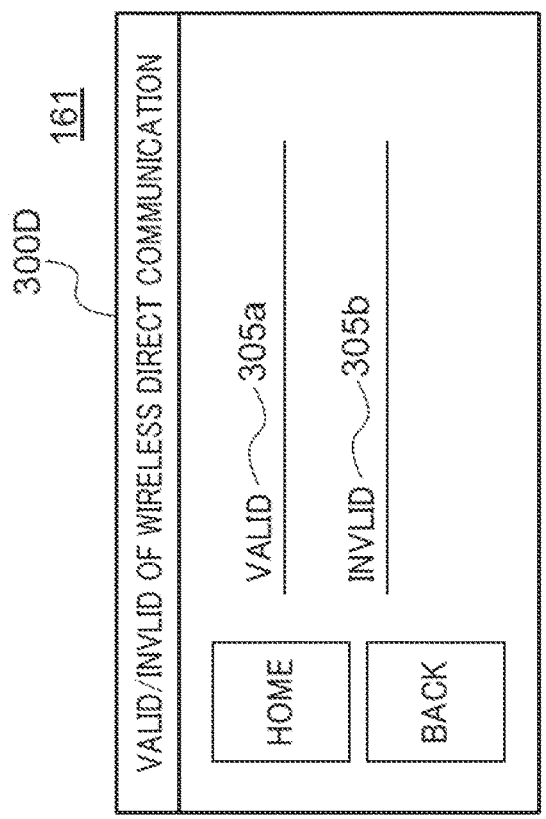
Figure 3D:
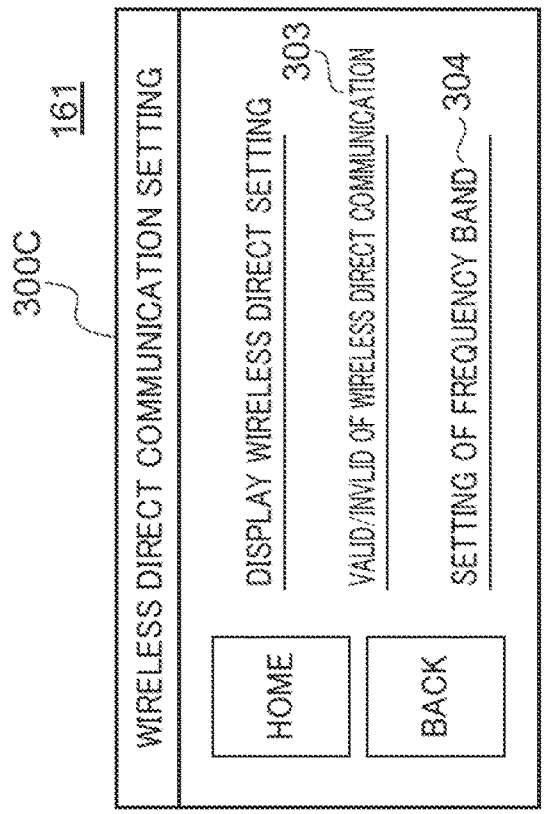
Figure 3F:
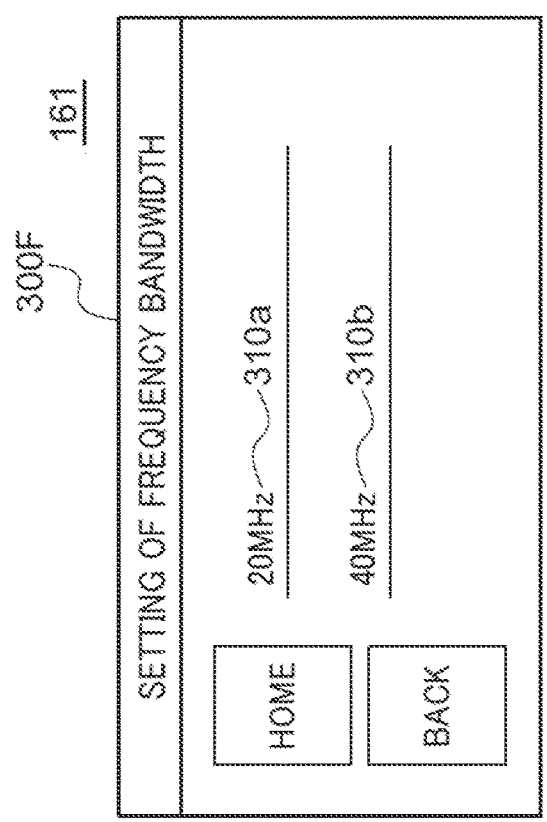

FIGS. 3A to 3I are diagrams for explaining examples of screens for performing various settings of direct communication. Each screen is displayed on the display part 161 of the MFP 151. A screen 300A shown in FIG. 3A is an initial screen displayed when various settings of direct communication are performed, and includes a LAN setting button (a LAN setting unit) 301. When the user selects the LAN setting button 301, the screen transitions to a screen 300B shown in FIG. 3B.

The screen 300B is a screen for LAN setting, that is, a screen for setting various network communications and the like. The screen 300B includes a setting part 302a for setting an infra communication mode ("Wi-Fi" in the drawing) (also referred to as a "wireless infra mode"), a setting part 302b for setting a direct communication mode (also referred to as a "wireless direct mode"), and a setting part 302c for setting printing of LAN setting information. When the user selects the setting part 302b, the screen transitions to a screen 300C shown in FIG. 3C.

The screen 300C is a screen for performing detailed setting of the direct communication mode. The screen 300C includes a switching part 303 for switching between making the direct communication mode valid and invalid, and a setting part 304 for setting a communication frequency band. When the user selects the switching part 303, the screen transitions to a screen 300D shown in FIG. 3D. When the user selects the setting part 304, the screen transitions to a screen 300E shown in FIG. 3E.

The screen 300D includes a setting part 305a for setting the direct communication mode in the MFP 151 to be valid and a setting part 305b for setting the direct communication mode in the MFP 151 to be invalid. In a case where the setting part 305a is selected, a frequency band in which communication with another device in the direct communication mode can be performed is set according to a process shown in FIG. 4.

The screen 300E is a screen for performing detailed setting of the communication frequency band. The screen 300E includes a setting part 306 for setting the frequency band of the direct communication mode to 2.4 GHz and a setting part 307 for setting the frequency band of the direct communication mode to 5 GHz. The screen 300E also includes a setting part 308 for automatically selecting and setting the frequency band of the direct communication mode. When the user selects the setting part 306, the screen transitions to a screen 300F shown in FIG. 3F. When the user selects the setting part 307 or the setting part 308, the screen transitions to a screen 300G shown in FIG. 3G.

The screen 300F includes a setting part 310a for setting the frequency bandwidth of the direct communication mode to 20 MHz and a setting part 310b for setting the frequency bandwidth of the direct communication mode to 40 MHz.

The screen 300G includes a setting part 311a for setting the frequency bandwidth of the direct communication mode to 20 MHz and a setting part 311b for setting the frequency bandwidth of the direct communication mode to 40 MHz.

The screen 300G further includes a setting part 311c for setting the frequency bandwidth of the direct communication mode to 80 MHz.

Figure 3E:
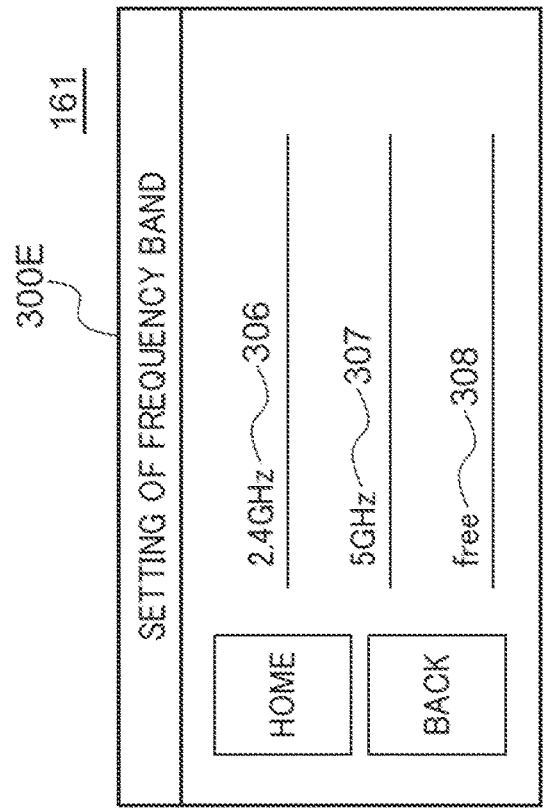
Figure 3H:
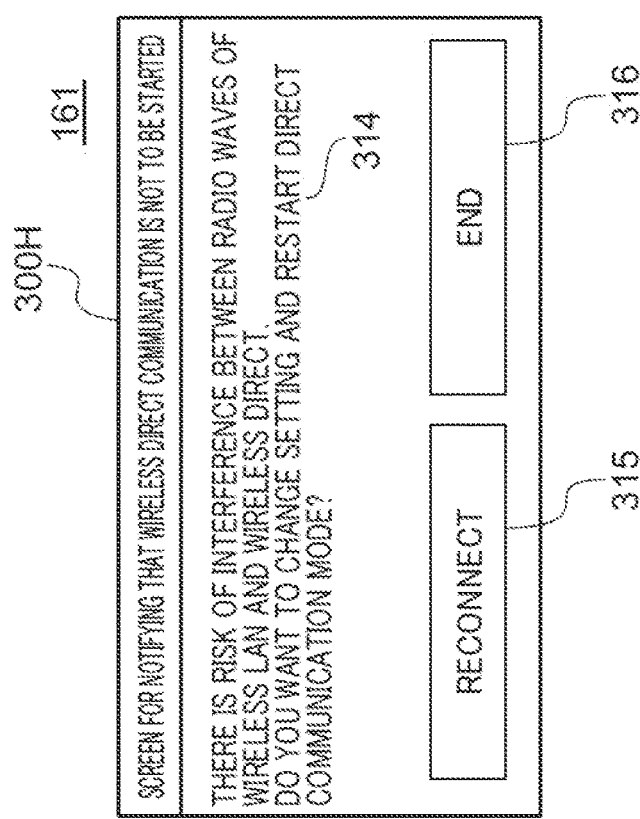

In addition, when the setting part 306 on the screen 300E shown in FIG. 3E is selected in a state where connection of wireless communication in the infra communication mode is made, the screen transitions to a screen 300H shown in FIG. 3H. The screen 300H is a screen for notifying the user of that the direct communication mode is not to be started, and includes a message 314. The screen 300H further includes a setting part 315 (a "reconnect" button in the drawing) for starting (restarting) the direct communication mode and setting reconnection, and a setting part 316 (an "end" button in the drawing) for setting wireless communication in the direct communication mode to be kept being disconnected.

Figure 3G:
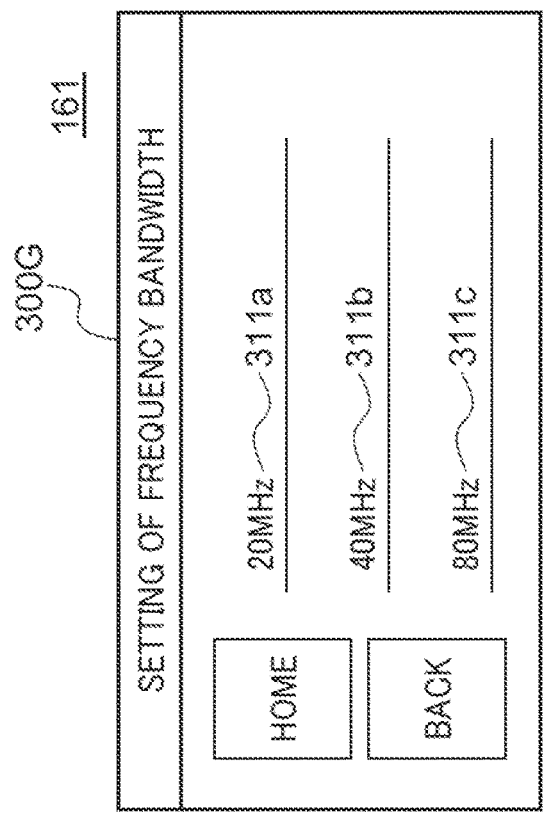
Figure 3I:
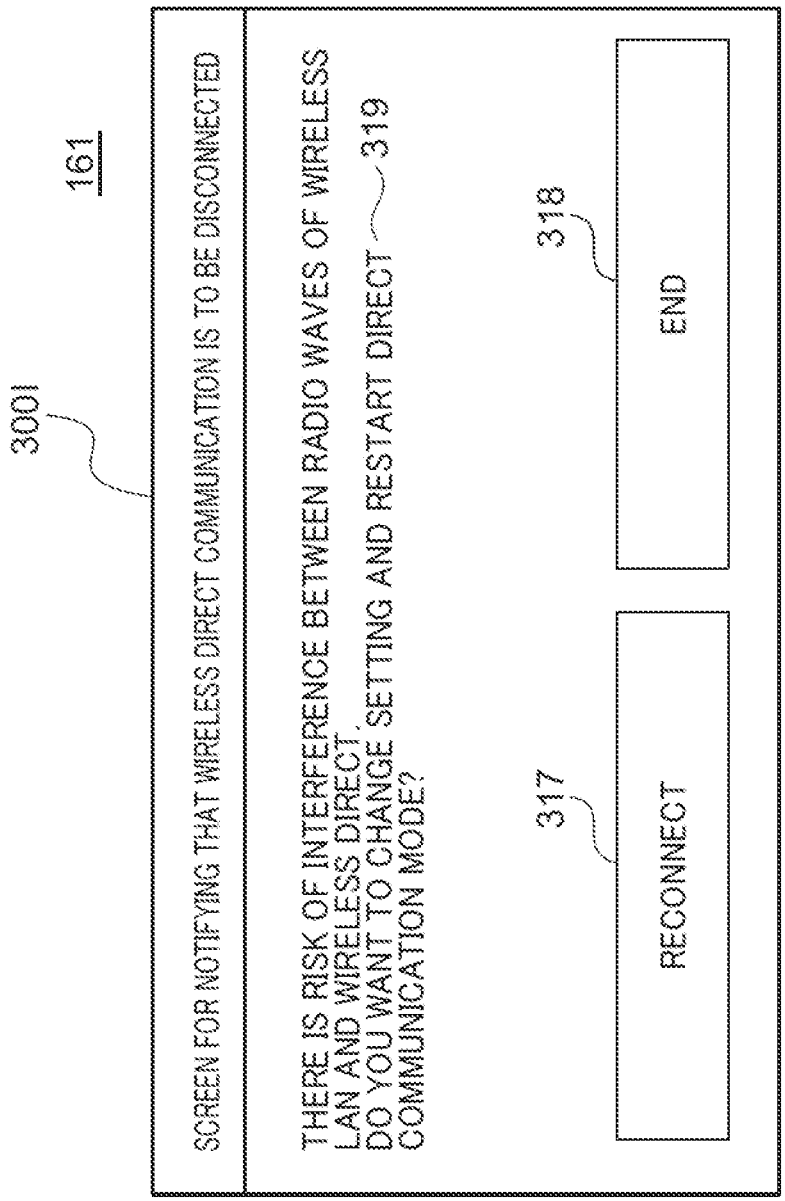

In addition, in a case where the setting part 302a on the screen 300B shown in FIG. 3B is selected in a state where connection of wireless communication in the direct communication mode is made, the screen transitions to a screen 300I shown in FIG. 3I. The screen 300I is a screen for notifying the user of that wireless communication in the direct communication mode is not to be started (is to be disconnected), and includes a message 319. The screen 300I further includes a setting part 317 (a "reconnect" button in the drawing) for starting (restarting) the direct communication mode and setting reconnection of wireless communication in the direct communication mode, and a setting part 318 (an "end" button in the drawing) for setting wireless communication in the direct communication mode to be kept being disconnected.

Figure 4:
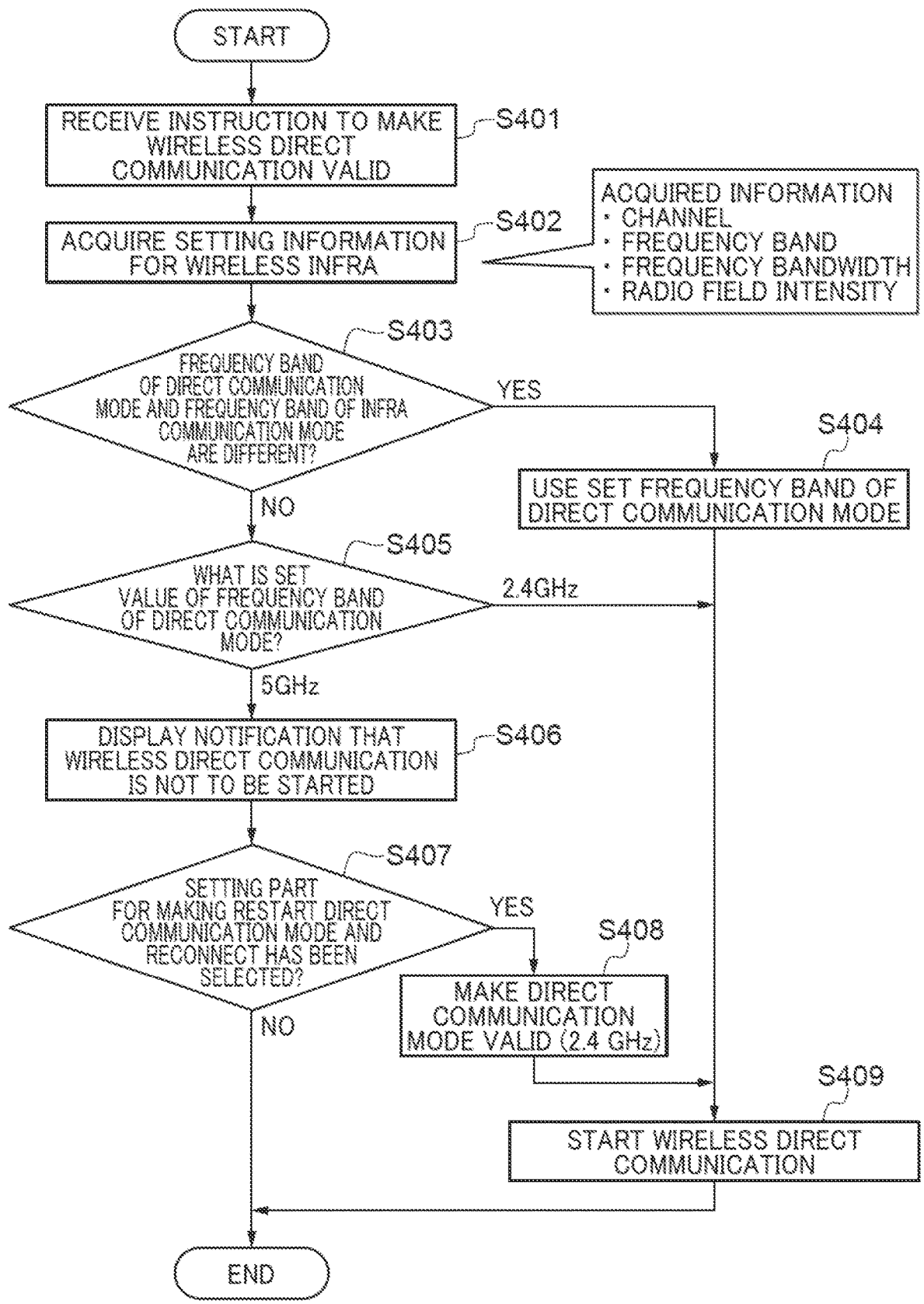
FIG. 4 is a flowchart of a process of changing a setting of a direct communication mode.

FIG. 4 is a flowchart of a process of changing the setting of the direct communication mode when the direct communication mode is started in a state where connection of wireless communication in the infra communication mode is made.

In step S401, in a state where the infra communication mode (also referred to as a "wireless infra (mode)") has already been executed and the execution of the direct communication mode has been stopped, the CPU 154 receives a selection (an instruction) of the setting part 305a on the screen 300D by a user's operation. As described above, the setting part 305a is a setting part for setting the direct communication mode (also referred to as a "wireless direct communication (mode)") to be valid.

In step S402, the CPU 154 acquires information on a channel, a frequency band, a frequency bandwidth, and a radio field intensity used in a state where connection for wireless communication via the communication part 156 is made, that is, used in the infra communication mode. Specifically, the CPU 154 is able to make this acquisition by reading, from the RAM 153 of the MFP 151, wireless parameters (first wireless parameters) of the infra communication mode held when the communication part 156 establishes connection in the infra communication mode. It should be noted that the wireless parameters include information on the frequency band of the infra communication mode, and are stored in the RAM 153 when wireless communication is performed in the infra communication mode.

In step S403, the CPU 154 compares the frequency band of the direct communication mode set on the screen 300E shown in FIG. 3E (a set value) with the frequency band of the infra communication mode acquired in step S402 (an acquired result). In this way, the CPU 154 determines whether or not the frequency band of the direct communication mode and the frequency band of the infra communication mode are different from each other, that is, they at least partially overlap each other. In a case where it is determined that the direct communication mode and the infra communication mode are different in frequency band (YES in step S403), the process proceeds to step S404. In a case where it is determined that the direct communication mode and the infra communication mode are not different in frequency band, that is, the frequency band of the direct communication mode and the frequency band of the infra communication mode are the same (NO in step S403), the process proceeds to step S405. For example, in a case where both frequency bands are 2.4 GHz, the process proceeds to step S405.

In step S404, the CPU 154 operates the MFP 151 as a group owner (or an internal access point) in the direct communication mode, in the frequency band of the direct communication mode set via the screen 300E shown in FIG. 3E. After step S404, the process proceeds to step S409.

In step S405, the CPU 154 reads the set value of the frequency band of the direct communication mode set via the screen 300E shown in FIG. 3E from the RAM 153. Then, the CPU 154 determines whether the set value of the frequency band of the direct communication mode is 2.4 GHz (2.4 GHz mode communication) or is 5 GHz (5 GHz mode communication), on the basis of the read frequency band. In a case where it is determined in step S405 that the set value of the frequency band of the direct communication mode is 2.4 GHz, the process proceeds to step S409. In a case where it is determined in step S405 that the set value of the frequency band of the direct communication mode is 5 GHz, the process proceeds to step S406.

In step S406, since the set value of the frequency band of the direct communication mode is 5 GHz and the set value of the frequency band of the infra communication mode is also 5 GHz, the CPU 154 causes the display part 161 of the MFP 151 to display the screen 300H shown in FIG. 3H. As a result, the user can grasp that the direct communication mode (wireless direct communication) is not to be started through the message 314 on the screen 300H. At this time, the state in which the execution of the direct communication mode is stopped is maintained. After step S406, the process proceeds to step S407.

In step S407, the CPU 154 determines whether or not the setting part 315 is selected on the screen 300H. As described above, the setting part 315 is a setting part for starting the direct communication mode and setting reconnection. In a case where it is determined that the setting part 315 has been selected (YES in step S407), the process proceeds to step S408. In a case where it is determined that the setting part 315 has not been selected, that is, in a case where it is determined that the setting part 316 has been selected (NO in step S407), the present process ends. As described above, the setting part 316 is a setting part for setting the communication in the direct communication mode to be kept being disconnected.

In step S408, the CPU 154 forcibly sets the frequency band of the direct communication mode to 2.4 GHz and makes the direct communication mode valid.

In step S409, the CPU 154 starts wireless communication in the direct communication mode.

As described above, in the communication system 1000, in a state where execution of the direct communication mode is set, it is determined whether or not there is an overlap between a frequency band (a first frequency band) to be used in the infra communication mode and a frequency band (a second frequency band) to be used in the direct communication mode. Then, as a result of the determination, in a case where it is determined that there is an overlap between the first frequency band and the second frequency band, the execution of the direct communication mode can be restricted (stopped) by the CPU 154 (execution restriction unit) (execution restriction step). On the other hand, in a case where it is determined that there is no overlap between the first frequency band and the second frequency band, the direct communication mode can be allowed to be executed.

It should be noted that the reason why step S406 is not executed in a case where it is determined as the 2.4 GHz in step S405 is as follows. First, 80 MHz can be set as a frequency bandwidth for the communication in the 5 GHz mode (FIG. 3G). That is, in a case where both the infra communication mode and the direct communication mode are the 5 GHz mode and the frequency bandwidth is set to 80 MHz, it is highly likely that interference occurs. On the other hand, since 80 MHz cannot be set for communication in the 2.4 GHz mode, it is less likely that interference occurs during the communication in the 2.4 GHz mode as compared with the communication in the 5 GHz mode. Therefore, in a case where it is determined as the 2.4 GHz mode is determined in step S405, step S406 is not executed. It should be noted that the reason why similar processing is performed in processes of flowcharts to be described below is the same as above.

As described above, conventionally, in a case where wireless communication in the infra communication mode and wireless communication in the direct communication mode are executed in parallel, there is a possibility that a decrease in throughput occurs depending on various conditions such as a frequency band used in each wireless communication. When the throughput decreases, convenience in wireless communication also decreases.

On the other hand, in the communication system 1000, whether or not the direct communication mode can be performed is switched, depending on whether or not there is an overlap between a frequency band of the direct communication mode and a frequency band of the infra communication mode. As a result, it is possible to prevent a decrease in throughput and improve convenience in wireless communication. In addition, in the communication system 1000, when it is instructed again to execute the direct communication mode, execution of the direct communication mode can be allowed. In this case, a frequency band that does not overlap the frequency band of the infra communication mode is used among the frequency bands of the direct communication mode. As a result, wireless communication in the direct communication mode can be performed, thereby further improving convenience in wireless communication.

Figure 5:
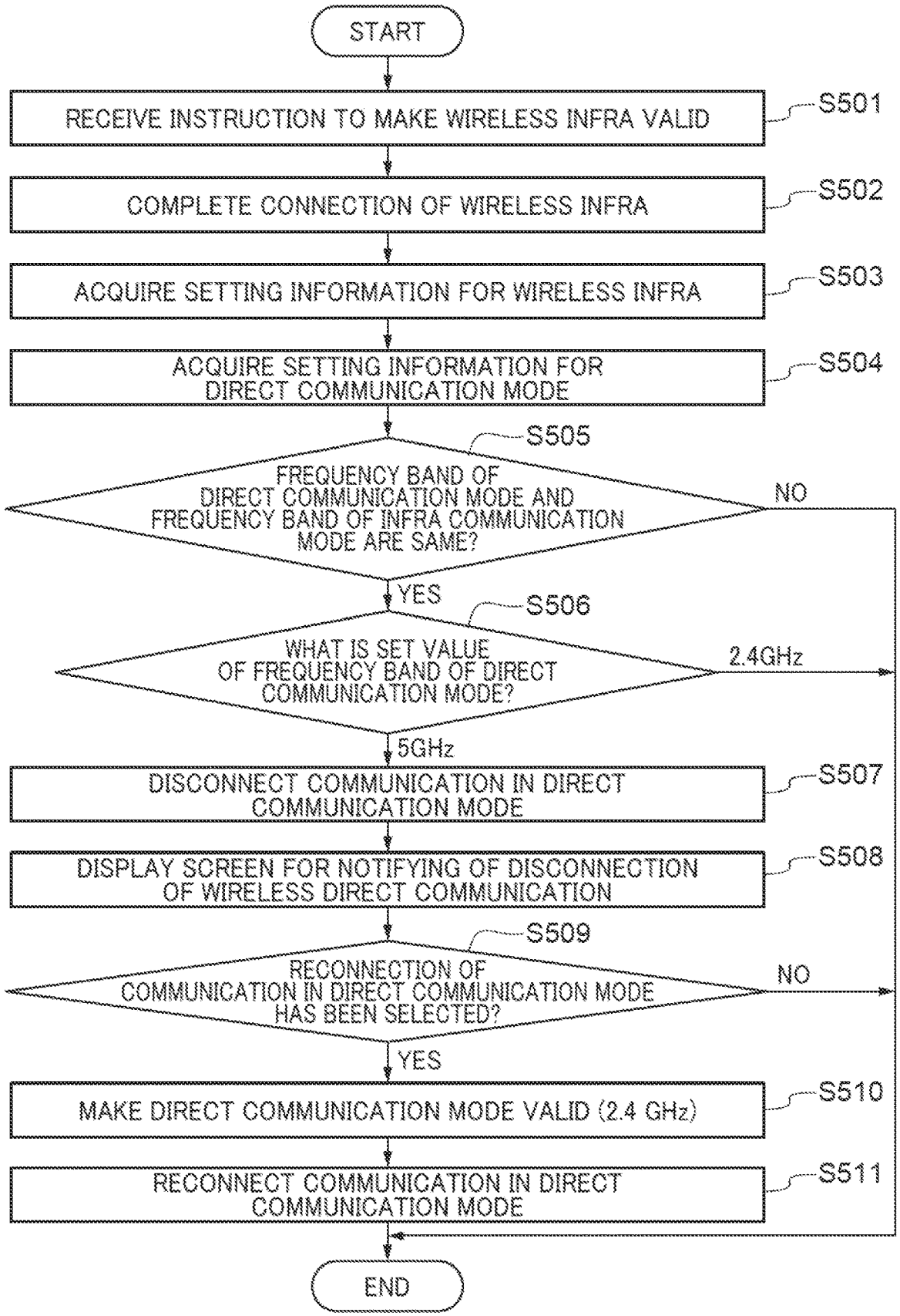
FIG. 5 is a flowchart of a process of changing a set value of a frequency band of the direct communication mode and performing reconnection of wireless communication in the direct communication mode.

FIG. 5 is a flowchart of a process of changing the set value of the frequency band of the direct communication mode and performing reconnection of wireless communication in the direct communication mode, after the wireless communication in the direct communication mode is disconnected, in a case where the infra communication mode is started in a state where connection of wireless communication in the direct communication mode is made.

In step S501, in a state where the direct communication mode has already been executed and the execution of the infra communication mode has stopped, the CPU 154 receives a selection of (an instruction via) the setting part 302a of the screen 300B by a user's operation. As described above, the setting part 302a is a setting part for setting the infra communication mode.

In step S502, the CPU 154 starts the infra communication mode with the setting (the setting condition) designated in step S501. As a result, the connection of the wireless infra is completed, and the connection of wireless communication in the infra communication mode is performed.

In step S503, the CPU 154 acquires information on a channel, a frequency band, a frequency bandwidth, and a radio field intensity used in the wireless communication (infra communication mode) connected in step S502, via the communication part 156. Specifically, the CPU 154 reads, from the RAM 153 of the MFP 151, wireless parameters of the infra communication mode held when connection in the infra communication mode is established.

In step S504, the CPU 154 acquires information on a channel, a frequency band, a frequency bandwidth, and a radio field intensity used in a state where connection for wireless communication via the communication part 156 is made, that is, used in the direct communication mode. Specifically, the CPU 154 reads, from the RAM 153, wireless parameters (second wireless parameters) of the direct communication mode held when connection in the direct communication mode is established. It should be noted that the second wireless parameters include information on the frequency band of the direct communication mode, and are stored in the RAM 153 when wireless communication in the direct communication mode is performed. It should be noted that step S503 and step S504 may be executed in a switching order.

In step S505, the CPU 154 compares the frequency band of the infra communication mode acquired in step S503 with the frequency band of the direct communication mode acquired in step S504. In this way, the CPU 154 determines whether or not the frequency band of the infra communication mode and the frequency band of the direct communication mode are the same, that is, they at least partially overlap each other. Then, in a case where it is determined that the frequency band of the direct communication mode and the frequency band of the infra communication mode are the same (YES in step S505), the process proceeds to step S506. In a case where it is determined that the frequency band of the direct communication mode and the frequency band of the infra communication mode are not the same (NO in step S505), the present process ends.

In step S506, the CPU 154 reads the set value of the frequency band of the direct communication mode set via the screen 300E shown in FIG. 3E from the RAM 153. Then, the CPU 154 determines whether the read set value of the frequency band of the direct communication mode is 2.4 GHz (2.4 GHz mode communication) or 5 GHz (5 GHz mode communication). In a case where it is determined in step S506 that the set value of the frequency band of the direct communication mode is 2.4 GHz, the present process ends. In a case where it is determined in step S506 that the set value of the frequency band of the direct communication mode is 5 GHz, the process proceeds to step S507.

In step S507, since the set value of the frequency band of the direct communication mode is 5 GHz and the set value of the frequency band of the infra communication mode is also 5 GHz, the CPU 154 disconnects the wireless communication in the direct communication mode. It should be noted that the processing of step S507 may be processing of stopping the direct communication mode instead of disconnecting the wireless communication in the direct communication mode.

In step S508, the CPU 154 causes the display part 161 of the MFP 151 to display the screen 300I shown in FIG. 3I. As a result, the user can grasp that the direct communication mode (wireless direct communication) is not to be started.

In step S509, the CPU 154 determines whether or not the setting part 317 has been selected on the screen 300I. As described above, the setting part 317 is a setting part for starting the direct communication mode and setting reconnection. In a case where it is determined that the setting part 317 has been selected (YES in step S509), the process proceeds to step S510. In a case where it is determined that the setting part 317 has not been selected, that is, in a case where it is determined that the setting part 318 has been selected (NO in step S509), the present process ends. As described above, the setting part 318 is a setting part for setting wireless communication in the direct communication mode to be kept being disconnected.

In step S510, the CPU 154 forcibly sets the frequency band of the direct communication mode to 2.4 GHz and makes the direct communication mode valid.

In step S511, the CPU 154 reconnects the wireless communication in the direct communication mode. That is, the CPU 154 operates the MFP 151 as a master station that performs wireless communication at 2.4 GHz.

As described above, in the communication system 1000, in a case where the infra communication mode is started in a state where connection of wireless communication in the direct communication mode is made, the wireless communication in the direct communication mode is disconnected, or the direct communication mode is stopped. As a result, it is possible to prevent a decrease in throughput and improve convenience in wireless communication. It should be noted that after the disconnection, the wireless communication in the direct communication mode can be reconnected.

Figure 6:
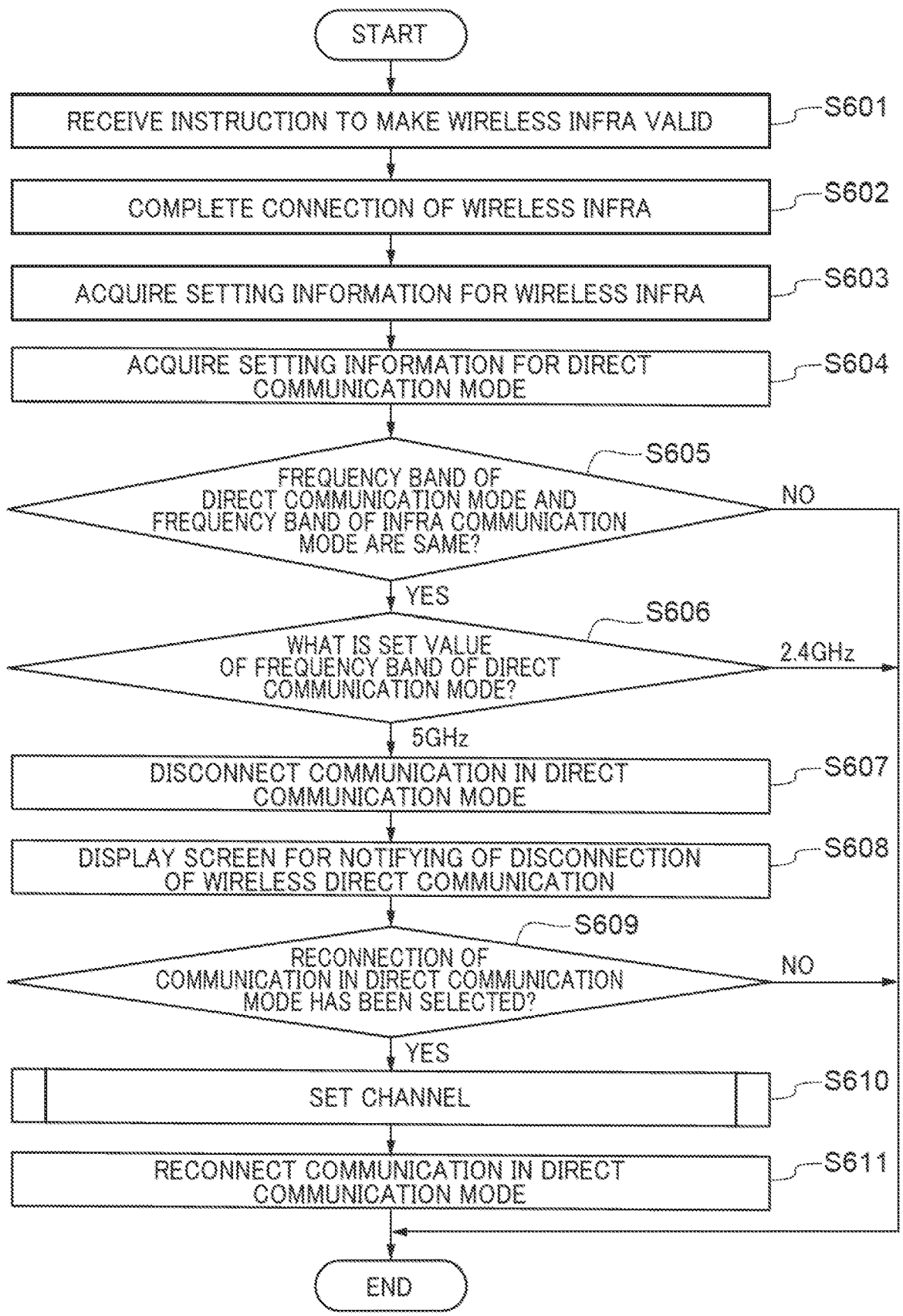
FIG. 6 is a flowchart of a process of changing a set value of a channel of the direct communication mode and performing reconnection of wireless communication in the direct communication mode.

FIG. 6 is a flowchart of a process of changing the set value of the channel of the direct communication mode and performing reconnection of wireless communication in the direct communication mode, after the wireless communication in the direct communication mode is disconnected, in a case where the infra communication mode is started in a state where connection of wireless communication in the direct communication mode is made.

In step S601, in a state where the direct communication mode has already been executed and the execution of the infra communication mode has stopped, the CPU 154 receives a selection of (an instruction via) the setting part 302a of the screen 300B by a user's operation.

In step S602, the CPU 154 starts the infra communication mode with the setting (the setting condition) designated in step S601. As a result, the connection of the wireless infra is completed, and the connection of wireless communication in the infra communication mode is performed.

In step S603, the CPU 154 acquires information on a channel, a frequency band, a frequency bandwidth, and a radio field intensity used in the wireless communication (infra communication mode) connected in step S602, via the communication part 156.

In step S604, the CPU 154 acquires information on a channel, a frequency band, a frequency bandwidth, and a radio field intensity used in a state where connection for wireless communication via the communication part 156 is made, that is, used in the direct communication mode. Specifically, the CPU 154 reads, from the RAM 153, wireless parameters of the direct communication mode held when connection in the direct communication mode is established. It should be noted that step S603 and step S604 may be executed in a switching order.

In step S605, the CPU 154 compares the frequency band of the infra communication mode acquired in step S603 with the frequency band of the direct communication mode acquired in step S604. In this way, the CPU 154 determines whether or not the frequency band of the infra communication mode and the frequency band of the direct communication mode are the same. Then, in a case where it is determined that the frequency band of the direct communication mode and the frequency band of the infra communication mode are the same (YES in step S605), the process proceeds to step S606. In a case where it is determined that the frequency band of the direct communication mode and the frequency band of the infra communication mode are not the same (NO in step S605), the present process ends.

In step S606, the CPU 154 reads the set value of the frequency band of the direct communication mode set via the screen 300E shown in FIG. 3E from the RAM 153. Then, the CPU 154 determines whether the read set value of the frequency band of the direct communication mode is 2.4 GHz (2.4 GHz mode communication) or 5 GHz (5 GHz mode communication). In a case where it is determined in step S606 that the set value of the frequency band of the direct communication mode is 2.4 GHz, the present process ends. In a case where it is determined in step S606 that the set value of the frequency band of the direct communication mode is 5 GHz, the process proceeds to step S607.

In step S607, since the set value of the frequency band of the direct communication mode is 5 GHz and the set value of the frequency band of the infra communication mode is also 5 GHz, the CPU 154 disconnects the wireless communication in the direct communication mode. It should be noted that the processing of step S607 may be processing of stopping the direct communication mode, instead of disconnecting the wireless communication in the direct communication mode.

In step S608, the CPU 154 causes the display part 161 of the MFP 151 to display the screen 300I shown in FIG. 3I.

In step S609, the CPU 154 determines whether or not the setting part 317 has been selected on the screen 300I. In a case where it is determined that the setting part 317 has been selected (YES in step S609), the process proceeds to step S610. In a case where it is determined that the setting part 317 has not been selected (NO in step S609), the present process ends.

Figure 7:
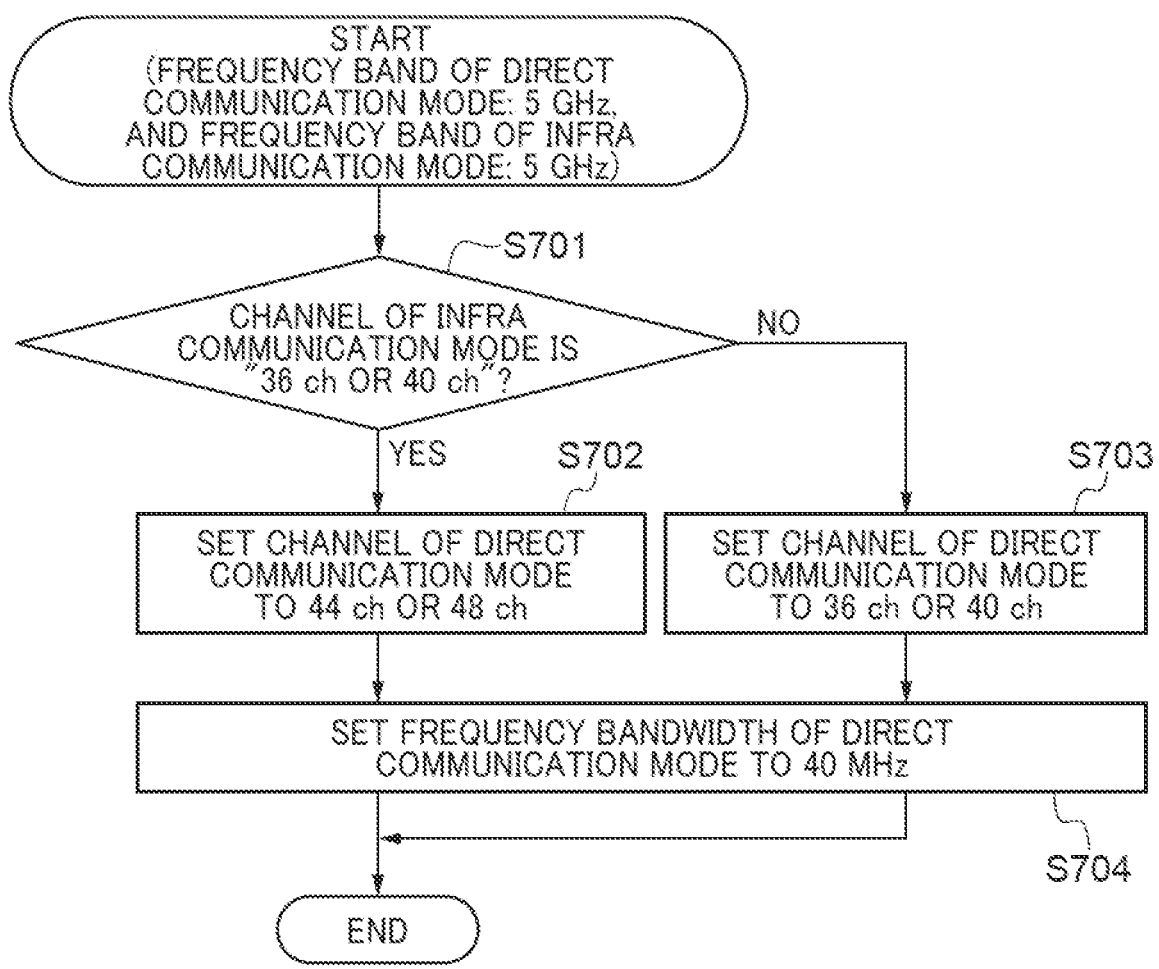
FIG. 7 is a flowchart of a process of setting the channel of the direct communication mode.

In step S610, the CPU 154 sets a channel of the direct communication mode according to a process shown in FIG. 7.

In step S611, the wireless communication in the direct communication mode is reconnected.

FIG. 7 is a flowchart of a process of setting the channel of the direct communication mode (a subroutine of step S610). In the process shown in FIG. 7, the frequency bandwidth of the wireless communication in the direct communication mode is changed in a state where the wireless communication is connected with the set value of the frequency band of the set direct communication mode being 5 GHz and the set value of the frequency band of the infra communication mode being 5 GHz.

In step S701, the CPU 154 reads the channel of the infra communication mode acquired in step S603 in FIG. 6. Then, the CPU 154 determines whether or not the channel of the infra communication mode is "36 ch or 40 ch". In a case where it is determined that the channel of the infra communication mode is "36 ch or 40 ch" (YES in step S701), the process proceeds to step S702. In a case where it is determined that the channel of the infra communication mode is not "36 ch or ch" (NO in step S701), the process proceeds to step S703.

In step S702, the CPU 154 sets the channel of the direct communication mode to 44 ch or 48 ch, and the process proceeds to step S704.

In step S703, the CPU 154 sets the channel of the direct communication mode to 36 ch or 40 ch, and the process proceeds to step S704.

In step S704, the CPU 154 sets the frequency bandwidth of the direct communication mode to 40 MHz. In a case where the frequency band width of the infra communication mode is 20 MHz or 40 MHz, it is possible to prevent a decrease in throughput caused by interference between both wireless communications.

In addition, among communication schemes conforming to IEEE802.11 series, in a communication scheme conforming to IEEE802.11ac or IEEE802.11ax, a frequency band width of 80 MHz of the infra communication mode is used. In the wireless LAN, a data transmission-side device transmits a request to send (RTS) signal to a data reception-side device, and the reception-side device that has received the RTS signal transmits a clear to send (CTS) signal to the transmission-side device, that is, returns a CTS signal to the transmission-side device. In this way, data transmission is started. In the wireless LAN, transmission and reception of such signals are repeated.

If there is no free channel in the reception-side device, even though the CPU 154 transmits an RTS signal, the reception-side device does not transmit a CTS signal. In a case where the CPU 154 operates the direct communication mode with the frequency band width of 40 MHz while the infra communication mode is operated with the frequency band width of 80 MHz, the CPU 154 does not receive a CTS signal. Then, the CPU 154 detects that interference of the frequency bands. Therefore, the CPU 154 changes the frequency band width of the infra communication mode operated at 80 MHz to 40 MHz to perform communication. As a result, it is possible to prevent interference between wireless communication in the direct communication mode and wireless communication in the infra communication mode, thereby minimizing a decrease in throughput as much as possible.

As described above, each of the infra communication mode and the direct communication mode has a plurality of channels. When the direct communication mode is executed, a channel that does not interfere with the channel of the infra communication mode is used. In this way, it is possible to prevent interference between the wireless communication in the direct communication mode and the wireless communication in the infra communication mode, and to prevent or suppress a decrease in throughput.

It should be noted that, although the MFP 151 is applied as a communication device capable of communicating with the mobile terminal 101 in the present embodiment, the present invention is not limited thereto. For example, a personal computer, a tablet terminal, a smartphone, or the like can also be applied as the communication device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-201240, filed Dec. 16, 2022, which is hereby incorporated by reference herein in its entirety.

What is claimed is:

1. A communication device capable of executing wireless communication with another communication device, the communication device comprising:
   at least one memory and at least one processor and/or at least one circuit which function as:
   a first communication unit configured to perform communication in a first mode in which wireless communication with another communication device is performed via a relay device according to a communication scheme conforming to a predetermined communication standard;
   a second communication unit configured to perform communication in a second mode in which wireless communication with another communication device is performed without using the relay device according to the communication scheme conforming to the predetermined communication standard;
   a setting unit configured to set a frequency band to be used for communication in the second mode; and
   a control unit configured to perform control such that:
      when wireless communication is performed in the second mode in a case where connection of wireless communication in the first mode using a frequency band at least partially overlapping the frequency band set by the setting unit is not made, the wireless communication in the second mode is performed using the frequency band set by the setting unit; and
      in a case where a first frequency band is set by the setting unit and connection of wireless communication in the first mode is made using a frequency band at least partially overlapping the first frequency band, connection of the wireless communication in the second mode using the first frequency band is not performed.

2. The communication device according to claim 1, wherein
   when wireless communication is performed in the second mode in a case where the connection of wireless communication in the first mode is performed using a frequency band that does not overlap the frequency band set by the setting unit, the control unit performs control such that connection of the wireless communication in the second mode is performed using the frequency band set by the setting unit.

3. The communication device according to claim 1, wherein
   in a case where the first frequency band is set by the setting unit and the connection of wireless communication in the first mode is made using the frequency band at least partially overlapping the first frequency band, the control unit performs control such that even if an operation of instructing connection of wireless communication in the second mode is received, connection of wireless communication in the second mode using the first frequency band is not performed.

4. The communication device according to claim 3, wherein
   in a case where the first frequency band is set by the setting unit and the connection of wireless communication in the first mode is made using the frequency band at least partially overlapping the first frequency band, when an operation of instructing connection of wireless communication in the second mode is received, the control unit performs control such that connection of wireless communication in the second mode is performed using a second frequency band different from the first frequency band.

5. The communication device according to claim 3, wherein
   in a case where the first frequency band is set by the setting unit and the connection of wireless communication in the first mode is made using the frequency band at least partially overlapping the first frequency band, when an operation of instructing connection of wireless communication in the second mode is received, the control unit performs control such that connection of wireless communication in the second mode is not performed.

6. The communication device according to claim 3, wherein
   in a case where the first frequency band is set by the setting unit and the connection of wireless communication in the first mode is made using the frequency band at least partially overlapping the first frequency band, when an operation of instructing connection of wireless communication in the second mode is received, the control unit performs control such that a screen for confirming with a user whether or not to perform connection of wireless communication in the second mode using a frequency band different from the first frequency band is displayed, and performs control such that when an operation corresponding to performing connection of wireless communication in the second mode using the frequency band different from the first frequency band is received, connection of wireless communication in the second mode is performed using a second frequency band different from the first frequency band.

7. The communication device according to claim 1, wherein
   in a case where the first frequency band is set by the setting unit and connection of wireless communication in the second mode is made using the first frequency band, when the connection of wireless communication in the first mode using the frequency band at least partially overlapping the first frequency band is started, the control unit performs control such that connection of the wireless communication in the second mode using the first frequency band is disconnected.

8. The communication device according to claim 7, wherein
after the disconnection, the control unit performs control such that the connection of wireless communication in the second mode is performed using a second frequency band different from the first frequency band.

9. The communication device according to claim 7, wherein
after the disconnection, the control unit performs control such that a screen for confirming with a user whether or not to perform connection of wireless communication in the second mode using a frequency band different from the first frequency band is displayed, and performs control such that when an operation corresponding to performing connection of wireless communication in the second mode using the frequency band different from the first frequency band is received, the connection of wireless communication in the second mode is performed using a second frequency band different from the first frequency band.

10. The communication device according to claim 1, wherein
in a case where a second frequency band different from the first frequency band is set by the setting unit, the control unit performs control such that even when the connection of wireless communication in the first mode using the frequency band at least partially overlapping the frequency band set by the setting unit is performed, wireless communication in the second mode using the second frequency band is performed.

11. The communication device according to claim 1, wherein the first frequency band is a 5 GHz band.

12. The communication device according to claim 1, wherein
80 MHz can be set by the setting unit as a frequency bandwidth to be used for wireless communication in the second mode.

13. The communication device according to claim 1, wherein the communication scheme conforming to the predetermined communication standard is a communication scheme conforming to a communication standard of IEEE802.11.

14. The communication device according to claim 1, wherein the communication scheme conforming to the predetermined communication standard is a communication scheme conforming to a communication standard of IEEE802.11ax.

15. The communication device according to claim 1, further comprising:
a printing unit configured to perform printing on paper using a recording agent.

16. A control method of a communication device capable of executing wireless communication with another communication device, the control method comprising:
setting a frequency band to be used for communication in a second mode in which wireless communication with another communication device is performed without using a relay device according to a communication scheme conforming to a predetermined communication standard;
performing control to perform wireless communication in the second mode using the set frequency band, when the wireless communication is performed in the second mode in a case where connection of wireless communication in a first mode, in which wireless communication with another communication device is performed via the relay device according to the communication scheme conforming to the predetermined communication standard, using a frequency band at least partially overlapping the set frequency band is not made; and
performing connection of wireless communication in the first mode, using a frequency band at least partially overlapping a first frequency band, wherein the set frequency band is the first frequency band,
wherein control is performed such that in a case where the set frequency band is the first frequency band, and connection of wireless communication in the first mode is performed using a frequency band at least partially overlapping the first frequency band, connection of wireless communication in the second mode using the first frequency band is not performed.

17. A non-transitory computer-readable storage medium storing one or more programs configured to cause one or more computers to function as units in a communication device, the units comprising:
a first communication unit configured to perform communication in a first mode in which wireless communication with another communication device is performed via a relay device according to a communication scheme conforming to a predetermined communication standard;
a second communication unit configured to perform communication in a second mode in which wireless communication with another communication device is performed without using the relay device according to the communication scheme conforming to the predetermined communication standard;
a setting unit configured to set a frequency band to be used for communication in the second mode; and
a control unit configured to perform control such that:
when wireless communication is performed in the second mode in a case where connection of wireless communication in the first mode using a frequency band at least partially overlapping the frequency band set by the setting unit is not made, the wireless communication in the second mode is performed using the frequency band set by the setting unit; and
in a case where a first frequency band is set by the setting unit and connection of wireless communication in the first mode is made using a frequency band at least partially overlapping the first frequency band, connection of the wireless communication in the second mode using the first frequency band is not performed.

* * * * *